UNITED STATES PATENT OFFICE.

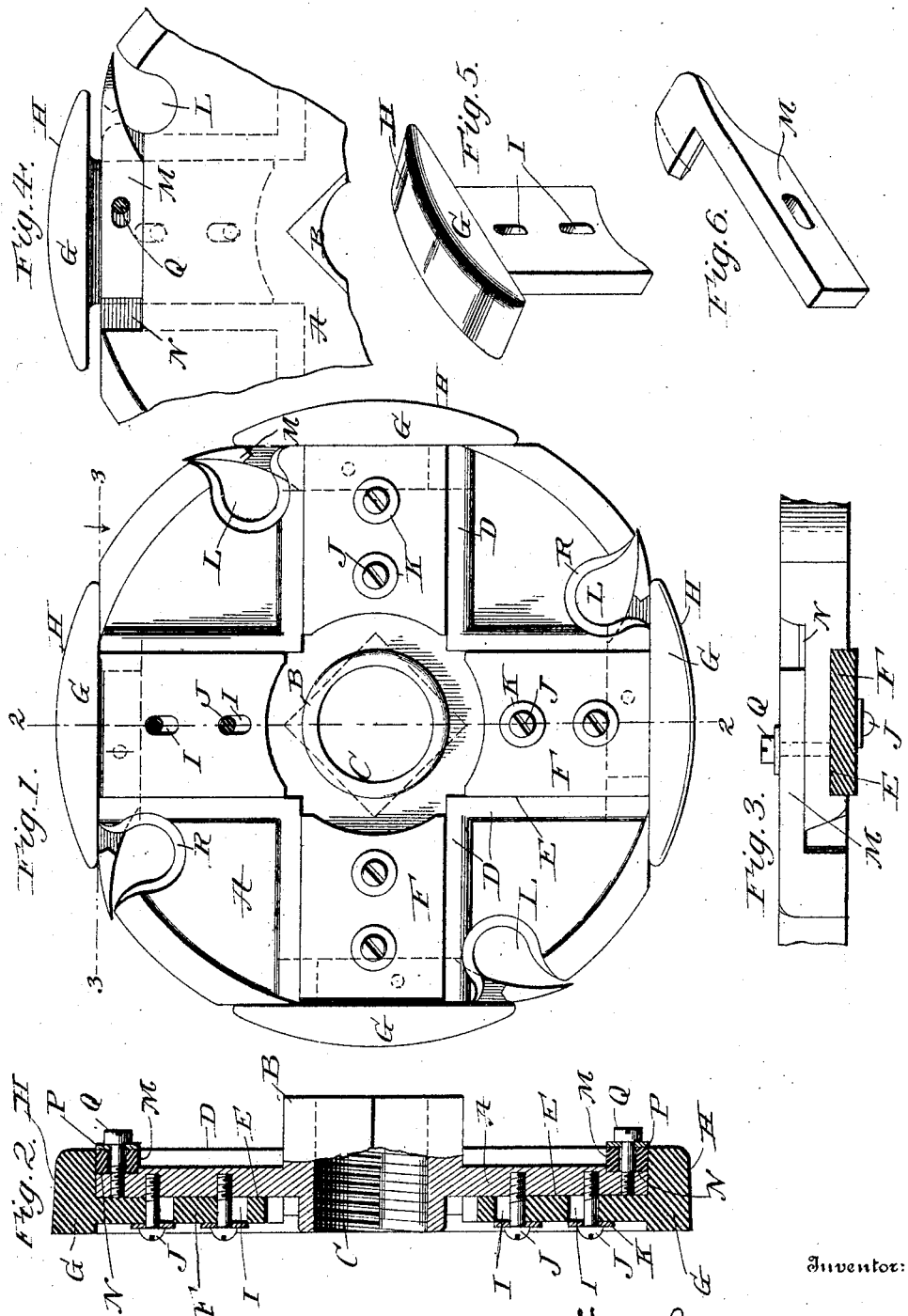

HENRY SIMPSON, OF ELMIRA, NEW YORK.

WOODWORKING-TOOL.

No. 796,537.  Specification of Letters Patent.  Patented Aug. 8, 1905.

Application filed June 7, 1905. Serial No. 264,170.

*To all whom it may concern:*

Be it known that I, HENRY SIMPSON, a citizen of the United States, residing at Elmira, in the county of Chemung and State of New York, have invented certain new and useful Improvements in Woodworking-Tools, of which the following is a specification.

My present invention relates to an improved woodworking-tool; and it consists, primarily, of a combined cutter-head and mandrel, the parts being so arranged and related that the tool may be used as a reamer.

The invention is shown in the annexed drawings, in which—

Figure 1 is a face view of the tool, showing the cutters protruded and the expanding-mandrel sections drawn inwardly; Fig. 2, a vertical sectional view on the line 2 2 of Fig. 1; Fig. 3, a sectional view on the line 3 3 of Fig. 1; Fig. 4, a side elevation of a portion of the tool, showing the cutter retracted and one of the radial shoes or expanding members protruded; Fig. 5, a perspective view of one of the shoes, and Fig. 6 a like view of one of the cutters.

In the manufacture of wood pipe it is essential that the reduced projecting end of the pipe-section which is to enter the socket in the adjacent section shall be perfectly true; but owing to variations in the condition of the wood employed in the construction of the pipes it is almost impossible to bind the staves together, so that the bore of the different pipe-sections shall be of the same size in each and every instance.

The tool is designed for use as a mandrel for holding the pipe-sections and also as a reamer or cutter-head for enlarging the internal diameter of the pipe in case a section is of a size less than that desired or some of the staves project inwardly to too great an extent. It comprises a body portion A, formed with a centrally-disposed hub B, provided with a centrally-disposed threaded opening C. The body is provided upon one face with a series of outwardly-extending ribs or projections D, which form four radially-disposed ways or channels E, in each of which is slidably mounted an expanding member or shoe F. Each of said shoes or members carries at its outer end a head G, which is curved, as shown at H, Figs. 2 and 5. The portions of the body A intermediate the expanding members F are curved to conform to the curvature of the heads G, as best shown in Fig. 1.

Each of the members F is provided with two or more slots I, through which are passed screws J, the screws entering the body A, as shown in Fig. 2. Preferably washers K are interposed between the heads of the screws and the body of the expanding member, so as to positively clamp said member in its adjusted position.

The body A is provided with recesses L, formed in the periphery thereof upon the opposite side of the body from the ways E.

A knife or cutter M of the shape best shown in Fig. 6 is seated in each groove or recess N, formed immediately adjacent to the outer edge of the body portion and in line with a way E upon the opposite side of the body. Each cutter may be projected outwardly to the desired extent and held in such position by a binding-screw Q, which passes through a slot formed in the cutter, a washer P being employed, as in connection with the screws J. The outer or working edge of the cutter lies within the recess L when the cutter is retracted, as in Fig. 4, and slightly overhangs the outer edge of the body portion A when the cutter is projected. This position is shown in Fig. 1.

Any chips which may be removed by the cutter will pass into the recess L, which is provided with a beveled or inclined face R (see Fig. 1) to enable the chips to readily clear themselves from the recess.

The expanding members or shoes are radially adjustable, while the cutters may be said to be adjustable tangentially. In practice if it be found that the bore of the pipe is too small or some of the staves have projected inwardly to too great an extent from one cause or another the expanding members are retracted as the cutters are projected, as will be seen upon reference to Fig. 1. The tool is then passed into the pipe, cutting away the projecting portions and making the bore of the desired diameter. When this is effected, the cutters may be retracted and the expanding members or shoes projected and secured in their adjusted positions. The tool is then forced inwardly into the pipe, and the rounded heads of the expanding members make a close and tight fit with the interior wall of the pipe and hold the same so that the projecting reduced end may be readily formed by the proper tool.

It is of course conceivable that the expanding members may be given a different form and that a greater number may be employed. It is also evident that the cutters may be of a different type so long as they are capable of being adjusted tangentially and moved inwardly to such an extent as not to interfere with the action of the expanding members.

Having thus described my invention, what I claim is—

1. In combination with a body portion, a series of radially-adjustable members or shoes; and a series of tangentially-adjustable knives or cutters.

2. In combination with a body portion having a series of openings or recesses about its periphery; a series of expanding members or shoes adjustable radially thereof; and a series of tangentially-adjustable knives carried by said body portion, the working or cutting edges of the knives overlying the recesses.

3. In combination with a body portion provided with a series of radially-disposed ways or channels; a shoe or expanding member mounted in each of said ways; means for securing said members in their adjusted positions; and a series of tangentially-adjustable knives carried by the body portion.

4. In combination with a body portion circular in contour; a series of radially-disposed shoes carried by said body portion, the outer faces of said shoes being curved to conform to the periphery of the body portion; a series of tangentially-disposed adjustable knives carried by the body portion; and means for securing said knives in their projected or retracted positions.

5. In combination with a body portion substantially circular in coutour; a series of radially-disposed shoes or expanding members carried by said body portion, the outer faces of said shoes being curved to conform to the periphery of the body portion; and a series of adjustable knives carried by the body portion.

6. In combination with a body portion provided with a series of radially-disposed ways or channels in one face; a shoe mounted in each of said channels; means for securing the shoes in their adjusted positions; a series of tangentially - disposed adjustable knives mounted upon the opposite face of the body portion; and means for securing said knives in their adjusted positions.

7. In combination with a body portion substantially circular in contour and provided with a series of ways or channels upon one face thereof; a shoe mounted in each of said ways, the outer faces of the shoes being curved to conform to the periphery of the body portion; means for securing said shoes in their adjusted positions; a series of adjustable knives mounted in recesses tangentially disposed upon the opposite face of the body portion, the working or cutting edges of said knives overlying the recesses formed in the body portion; and means for securing the knives in their adjusted positions.

In testimony whereof I have signed my name to this specification in the presence of two subscribing witnesses.

HENRY SIMPSON.

Witnesses:
  E. S. GIBBS,
  MORRIS NEWMARK.